Patented Mar. 30, 1948

2,438,819

UNITED STATES PATENT OFFICE 2,438,819

NITRATED ESTROGENIC HORMONES

Joseph B. Niederl, Brooklyn, N. Y.

No Drawing. Application April 28, 1945,
Serial No. 590,975

4 Claims. (Cl. 260—397.4)

This invention relates to new estrogenic compounds and to methods of producing the same. More particularly it relates to nitrated estrogenic hormones, to various derivatives thereof, and to methods of producing the same from crude estrogenic extract derived from the customary urinary sources as well as from partially or completely purified individual phenolic hormones, phenolic hormone mixtures, or derivatives thereof.

Basically considered the instant process is seen to involve the introduction of one or more nitro groups into the benzene ring of estrogenic hormones using especially developed micro and semi-micro procedures. Essentially the process involves treatment of the estrogenic hormone dissolved in an inert solvent, with one or two mols equivalent of concentrated nitric acid, to form the respective mono- or di-nitro derivatives.

The new nitrated estrogenic hormones may either be utilized directly or they may be converted into further derivatives such as esters, ethers or salts. These nitro compounds also form most important intermediates for further chemical transformations and syntheses.

The term estrogenic hormone includes not only various crude and partially purified extracts from natural sources but also such compounds as estrone, estradiol, estriol, as well as mixtures thereof.

The term estrogenic hormones also includes the the ethers and esters of the phenolic estrogenic hormones. It also includes carboxylated or halogenated estrogenic hormones, with or without a free phenolic hydroxy group.

Example I.—Mono-nitro estrone from pure estrone

One gram of pure estrone is dissolved in 25 ml. of boiling glacial acetic acid. This solution, while still hot but before crystallization sets in, is treated with one mol equivalent of nitric acid, as follows:

A micro dropping pipet is standardized first by counting the number of drops necessary for forming one cc. Pipets which give 40 drops for one ml. or 10 drops for 0.25 ml. have been found most convenient. Three drops of concentrated 70% nitric acid (spec. grav. 1.42) are added from a micro dropping pipet standardized as described above to the previously prepared hot glacial acetic acid solution of the estrone. After the addition of the first three drops, the reaction mixture is thoroughly shaken and allowed to cool further by immersing the reaction flask in cold water. An additional 7 drops of the nitrating agent are then slowly added followed by a thorough mixing after the addition of each and every drop.

The reaction mixture is then set aside at room temperature to allow the crystallization of the mono-nitro estrone. The crystals usually appear after the reaction mixture has stood for about 48 hours. The crystals are then separated by suction-filtration through a semi-micro glass fritter funnel. After washing of the crystals with a few ml. of cold glacial acetic acid, they are transferred to a porous tile (3"x3" and $\frac{1}{16}$" thick). They are covered by a watch glass and are allowed to dry at room temperature in air. When completely dry, they are re-crystallized from boiling glacial acetic acid. M. P. 258° C. (uncor.).

Following the above semi-micro nitration procedure, there appears to be no oxidation, which is most unusual with a compound of so complicated a structure, and the yield appears to be nearly quantitative.

Applying micro and semi-micro technics (using sealed capillaries, or centrifuge cones) the mono-nitro estrone is converted into various esters such as the acetate, propionate, butyrate, benzoate, p-nitro-benzoate, and 3,5-di-nitro benzoate, as well as ethers such as methyl ether, the ethyl ether or the benzyl ether.

The mono-nitro estrone itself as well as its derivatives exhibits interesting physiological properties.

Example II.—Di-nitro estrone from pure estrone

One gram of pure estrone is dissolved in 25 ml. of boiling glacial acetic acid. While still hot but before crystallization sets in, twenty drops (2 mol equivalents) of concentrated nitric acid are added in the manner and by means of the standardized micro dropping pipet as described in Example I.

The reaction mixture is again allowed to stand until the di-nitro estrone has crystallized out, or the reaction mixture is poured into 250 ml. of distilled water. The di-nitro estrone thus separates as a flocculent yellow precipitate, which is filtered off through a fluted filter paper and washed thoroughly with distilled water. After the filter paper with the precipitate has dried in air, the precipitate is transferred to a porous tile for completion of the drying process and is finally re-crystallized from hot glacial acetic acid, boiling methyl alcohol, or other organic solvents. M. P. 275° C. (uncor.).

Using appropriate micro- or semi-micro procedures the di-nitro estrone is converted into esters (acetate, propionate, benzoate, etc.) and ethers (methyl-, ethyl- or benzyl).

Example III.—Mono- and di-nitro estradiol

One gram of estradiol is dissolved in 20 ml. of boiling glacial acetic acid. The solution is allowed to cool until the first signs of crystallization begin to appear. At this moment dropwise addition of one mol of nitric acid (10 drops) is begun, utilizing the standardized micro dropping pipet, and following the procedure as given in Example I.

After standing for 48 hours the reaction mixture is poured into 250 ml. of distilled water and the precipitate of mono nitro estradiol is filtered off, washed repeatedly with distilled water and placed on porous tile. M. P. 175° C. (uncor.).

The di-nitro estradiol is prepared in exactly similar manner as the mono nitro estradiol and estratriol, except twice the amount of nitric acid is used. M. P. 215° C. (uncor.).

Substituting estriol for the estradiol produces the corresponding mono- and di-nitro estriol.

Example IV.—Mono- and di-nitro estrone from technical estrone

One gram of partially purified estrone is dissolved in 15 ml. to 20 ml. of boiling glacial acetic acid. This solution is then cooled and while still clear one or two mols equivalent of concentrated nitric acid are added in a manner similar to that described in Example I (10 or 20 drops of concentrated nitric acid, respectively, from the identical micro dropping pipet.)

The reaction mixture is then set aside at room temperature for 48 hours. After this time the reaction mixture is poured into 250 ml. of distilled water whereby the nitrated estrone precipitates out as a flocculent yellowish white precipitate. This precipitate is filtered off through fluted filter paper, repeatedly washed with distilled water, placed on porous tile and allowed to dry at room temperature. The material at this stage is a yellowish white powder which may be further purified by re-crystallization from boiling methyl alcohol or glacial acetic acid.

Example V.—Nitration of estrogenic hormone extract

One gram of semi-solid black tar derived from customary urinary sources, whose principal constituent is a mixture of the natural female hormones, is dissolved in 15 ml. of boiling glacial acetic acid. The solution is allowed to cool until the first signs of inhomogenuity are observed. At this moment 10 drops of concentrated nitric acid are added dropwise from the standardized micro dropping pipet, as described in Example I.

The reaction mixture again is allowed to stand for 48 hours and then poured into 250 ml. of distilled water. A brownish semi-solid precipitate is formed which may be further purified by fractional crystallization from methyl or ethyl alcohol, benzene or chloroform; or the crude mono-nitro estrogenic hormone mixture is used directly for further chemical transformation.

The semi-micro nitration process as described in the preceding 5 examples is not limited to the types of hormones cited therein but is equally applicable to esters and ethers of the phenolic estrogenic hormones, as well as to non-phenolic but benzenoid sterols. Unsaturated compounds, however, should not be employed for nitration purposes.

In cases where ring or side chain unsaturated hormones or sterols are to be subjected to nitration, it is desirable to first remove the unsaturation by subjecting such compounds to hydrogenation procedures prior to nitration.

The preceding nitration process is also applicable to benzenoid hormones or sterols possessing other groups instead of or in addition to the phenolic hydroxyl group, thus carboxylated or halogenated compounds may be equally well subjected to the foregoing nitration procedure.

It will be understood that the examples disclosed herein are illustrative, and that the invention is not limited to the specific reactants and reaction conditions disclosed but extends to equivalents encompassed within the scope of the invention which is defined by the appended claims.

I claim:

1. A process of producing a nitro estrone which comprises subjecting estrone dissolved in an inert solvent, at an elevated temperature, to the action of concentrated nitric acid.
2. Nitrated estrone.
3. Mono-nitro estrone.
4. Di-nitro estrone.

JOSEPH B. NIEDERL.

REFERENCES CITED

The following references are of record in the file of this patent:

UNITED STATES PATENTS

| Number | Name | Date |
|---|---|---|
| 1,412,707 | Richardson | Apr. 11, 1922 |
| 2,207,727 | Galloway | July 16, 1940 |

OTHER REFERENCES

Sobotka, Chemistry of the Sterids, 1938, page 99.